(12) United States Patent
Fontanili et al.

(10) Patent No.: US 6,959,722 B2
(45) Date of Patent: Nov. 1, 2005

(54) DEVICE FOR ADJUSTING THE DEGREE OF VACUUM IN AN APPARATUS FOR COLLECTING SUBSTANCES BY SUCTION

(75) Inventors: Paolo Fontanili, Correggio (IT); Fabio Balugani, Cavezzo (IT)

(73) Assignee: Eurosets S.R.L., Medolla (IT)

( * ) Notice: Subject to any disclaimer, the term of this patent is extended or adjusted under 35 U.S.C. 154(b) by 0 days.

(21) Appl. No.: 10/661,630

(22) Filed: Sep. 15, 2003

(65) Prior Publication Data

US 2004/0055639 A1 Mar. 25, 2004

(30) Foreign Application Priority Data

Sep. 20, 2002 (IT) ...................................... MI2002A0031

(51) Int. Cl.⁷ ................................................. F04F 3/00
(52) U.S. Cl. ........................ 137/205; 137/526; 137/528
(58) Field of Search ................................ 137/205, 526, 137/528

(56) References Cited

U.S. PATENT DOCUMENTS

| 3,360,007 | A | * | 12/1967 | Haidek et al. | ............... | 137/528 |
| 4,210,174 | A | * | 7/1980 | Eross | ......................... | 137/528 |
| 4,273,153 | A | * | 6/1981 | Brown | ....................... | 137/526 |
| 4,533,353 | A | * | 8/1985 | Akiyama | .................... | 137/205 |

* cited by examiner

Primary Examiner—Gerald A. Michalsky
(74) Attorney, Agent, or Firm—Guido Modiano; Albert Josif; Daniel O'Byrne

(57) ABSTRACT

A device for adjusting the degree of vacuum in an apparatus for collecting substances by suction, comprising a valve that is provided with an air flow port connected to the atmosphere at one end and to a chamber at the other end, the chamber being connected to a source of vacuum and to the apparatus, and the port comprising a flow control element that is adapted to be attracted into the closed position by the action of a permanent magnet supported in the body of the valve in an adjustable position.

9 Claims, 4 Drawing Sheets

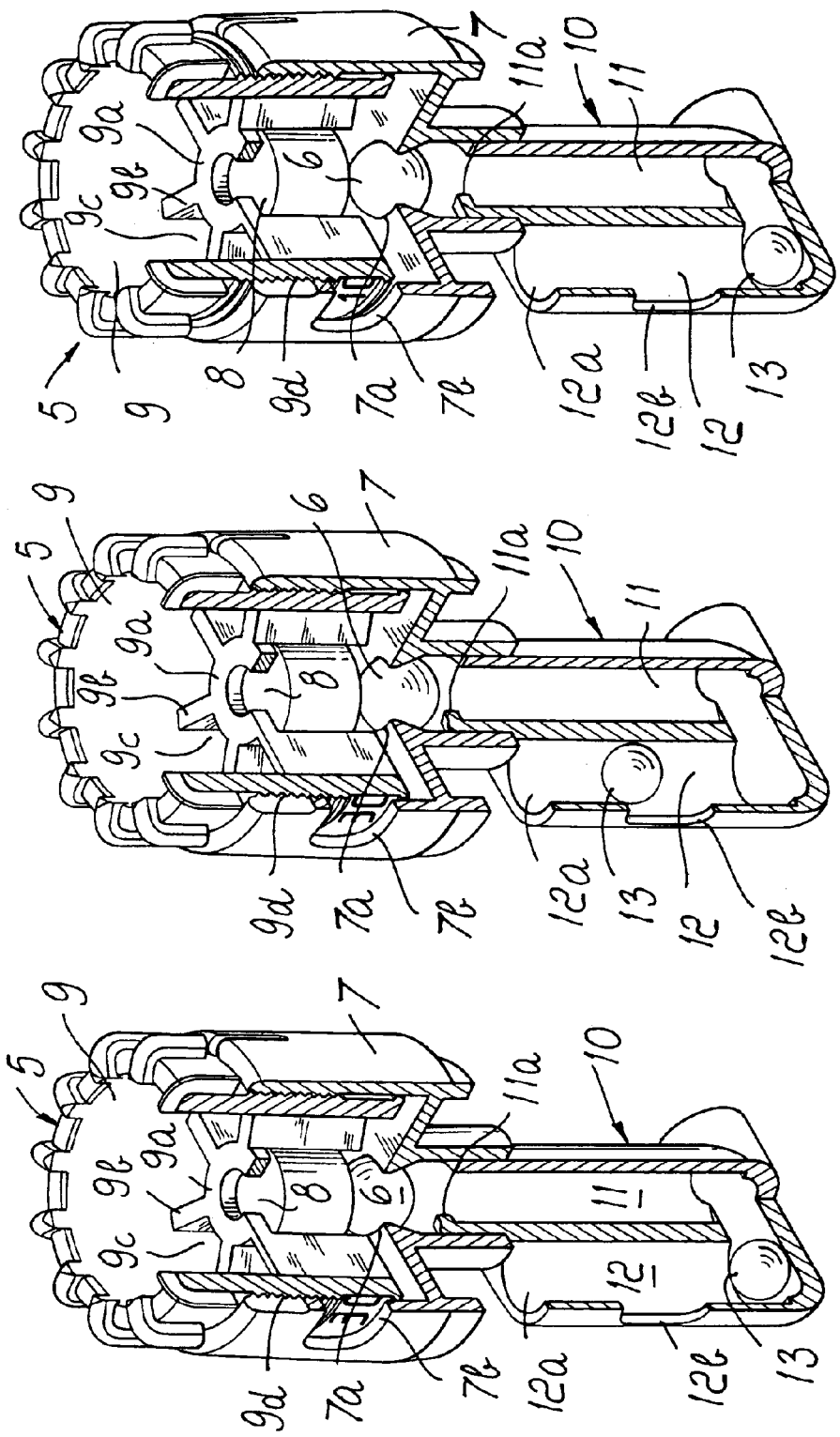

DEVICE FOR ADJUSTING THE DEGREE OF VACUUM IN AN APPARATUS FOR COLLECTING SUBSTANCES BY SUCTION

BACKGROUND OF THE INVENTION

The present invention relates to a device for adjusting the degree of vacuum in an apparatus for collecting substances by suction.

It is known that apparatuses adapted to aspirate various substances, particularly liquids, are used especially in the medical field: this is the case, for example, of apparatuses for collecting blood from drainages of the wounds of a patient in order to provide postoperative autotransfusion.

These apparatuses, which comprise a portion of space designed to be placed under low pressure or vacuum and connected by means of a duct to the sources of the liquid to be aspirated, are provided with a device for adjusting the degree of vacuum, which is provided according to various constructive embodiments, such as for example the one disclosed in Italian patent application MN00A000009 by the same Applicant.

SUMMARY OF THE INVENTION

Such device has a chamber that is designed to contain water up to a certain level and is connected, by means of two ducts that end above the free surface of the water, respectively to a source of vacuum and to a portion of space that is comprised in the collection apparatus and is designed to be placed under low pressure or vacuum in order to aspirate the liquid.

Such chamber is provided with a valve for connection to the atmosphere, which comprises a flow control element that is kept in the closed position by the action of a permanent magnet located at a specific height from the sealing surface designed for the abutment of the flow control element in the closed position.

Such device has proved excellent functionality, but continuing study has allowed to perfect new improvements, herein described, which have the dual aim of allowing to adjust with extremely simple maneuvers the value of the low pressure or vacuum inside the collection apparatus and to allow operation, if required, without water inside the chamber.

This aim is achieved by a device for adjusting the degree of vacuum in an apparatus for collecting substances by suction, according to the invention, characterized in that it comprises a valve provided with an air flow port that is connected to the atmosphere at one end and to a chamber at the other end, said chamber being connected to a source of vacuum and to said collection apparatus, said port comprising a flow control element that is adapted to be attracted into the closed position in abutment against a sealing surface by the action of a permanent magnet that is supported by means associated with the body of the valve in an adjustable position so as to allow to arrange said magnet at different distances with respect to said sealing surface.

BRIEF DESCRIPTION OF THE DRAWINGS

Further characteristics and advantages will become better apparent from the description of a preferred but not exclusive embodiment of the invention, illustrated by way of non-limitative example in the accompanying drawings, wherein:

FIGS. 2 and 3 are views of the detail of FIG. 1 related to the valve for connection to the atmosphere, in the configuration in which the permanent magnet is at the minimum distance from the sealing surface of the flow control element, respectively when no air is flowing and during operation with the flow port partially open;

FIG. 4 is a view of said valve in the configuration in which the magnet is at the maximum distance from the sealing surface of the flow control element, without air flow.

DESCRIPTION OF THE PREFERRED EMBODIMENTS

Figure 1:
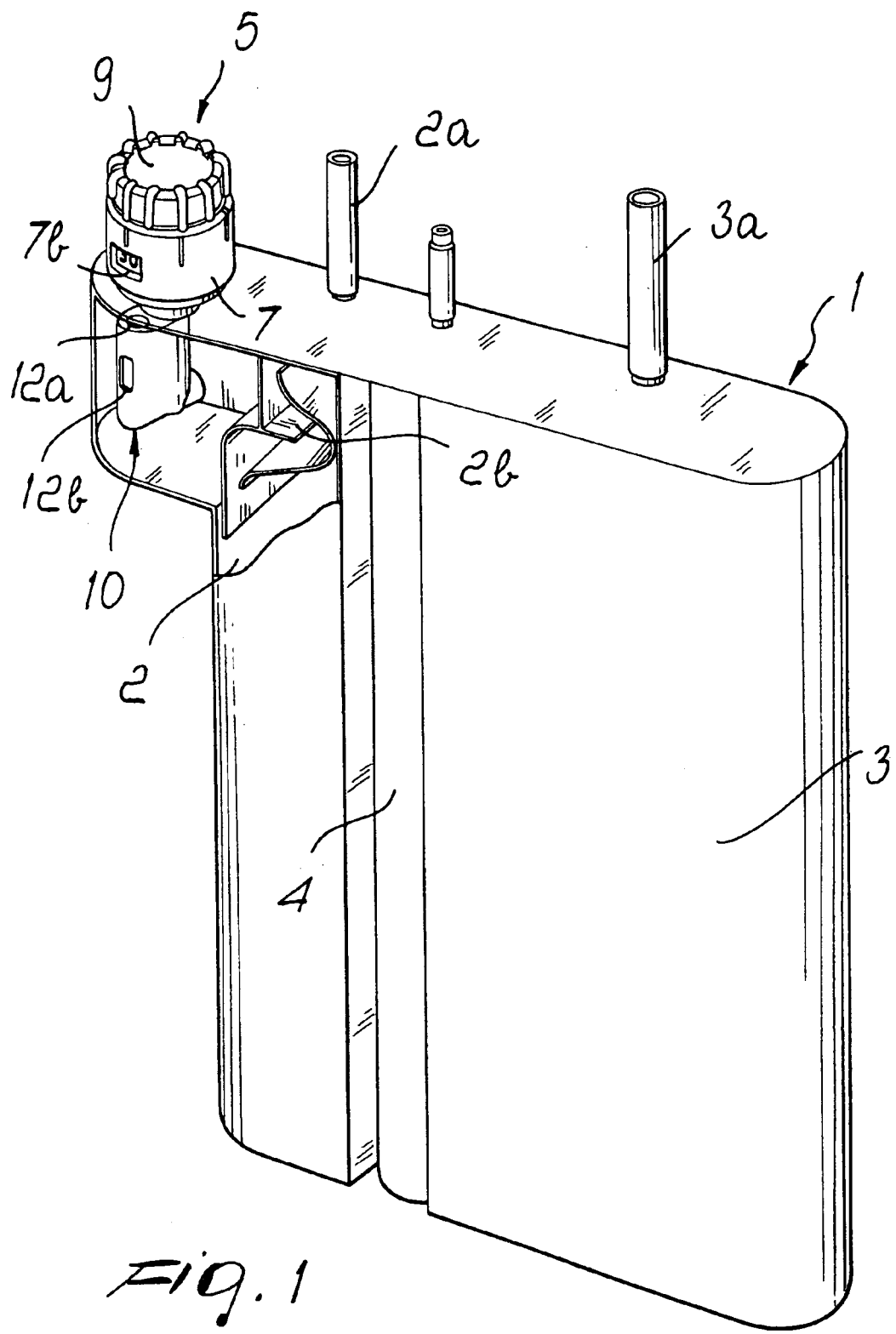
FIG. 1 is a perspective view of the invention applied to a blood collection apparatus, with part of the enclosure removed for illustration purposes.
Figure 5:
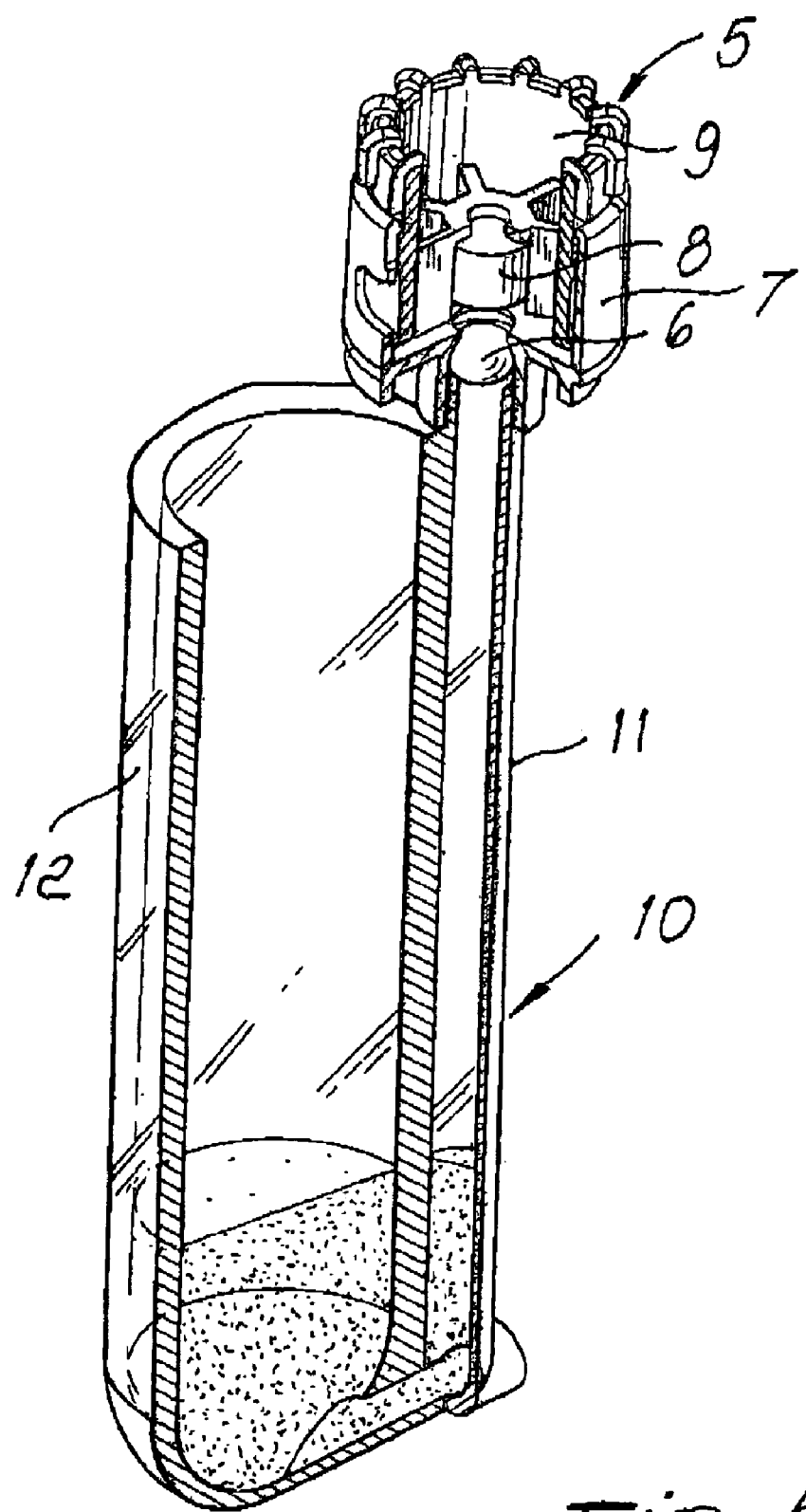
FIG. 5 is a different embodiment of the valve for connection to the atmosphere according to the invention.
Figure 6:
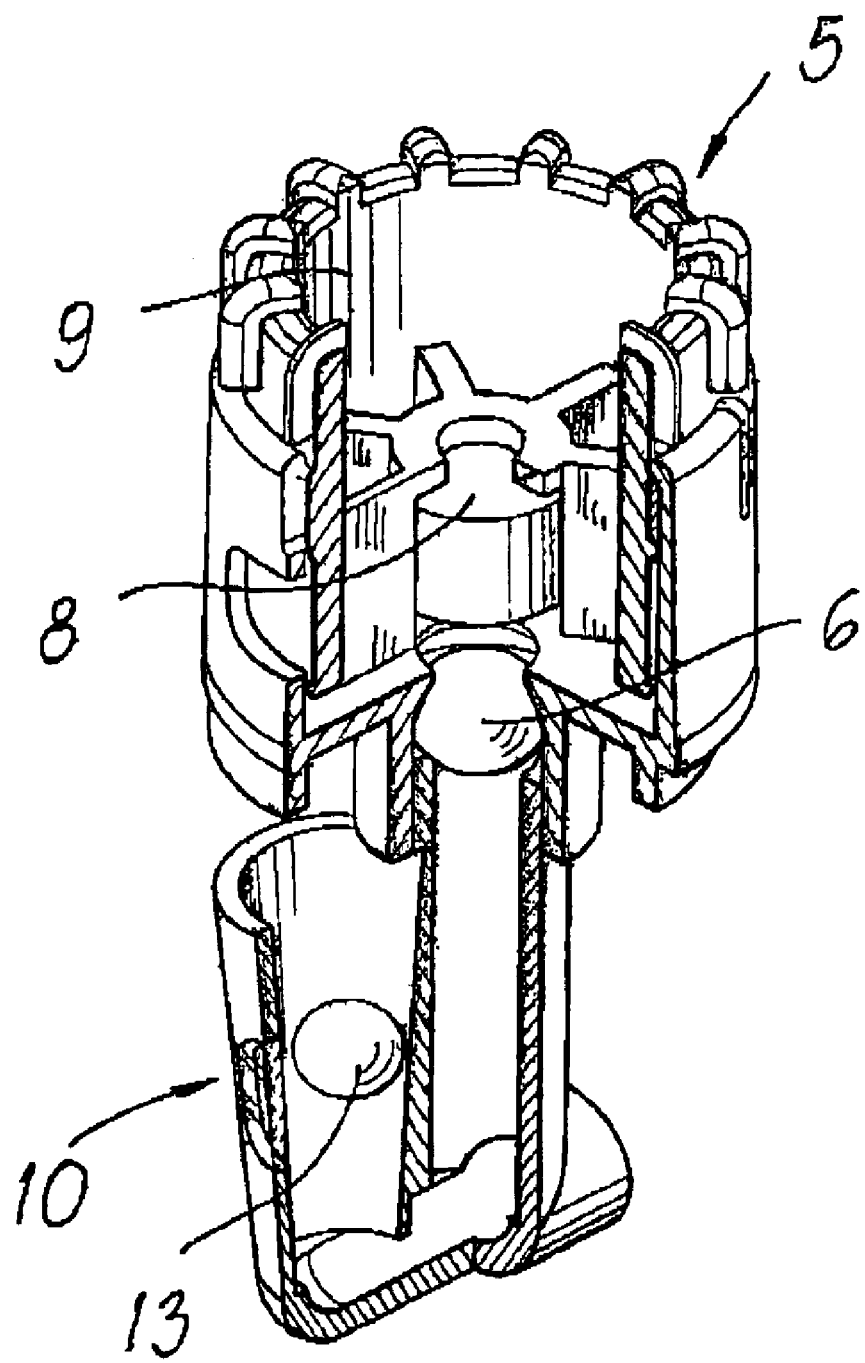
FIG. 6 is a further embodiment of the valve for connection to the atmosphere according to the invention.

With reference to the figures, the reference numeral 1 generally designates an assembly that comprises the device according to the invention and the collection apparatus, and the reference numeral 2 designates the chamber adapted to contain only air, which is connected by means of a first duct 2a to a source of vacuum and by means of a second duct, constituted by the labyrinth 2b, to the portion of space 3 comprised within the collection apparatus that is adapted to be placed under low pressure or vacuum in order to aspirate blood from the drainage system of a patient by means of a duct that is associated with the coupling 3a.

The water seal 4 is interposed in a known manner between the chamber 2 and the portion of space 3.

The chamber 2 is connected to the atmosphere by means of the valve, generally designated by the reference numeral 5, which comprises an air flow port in which the flow control element 6 is interposed; said flow control element is adapted to be attracted into the closed position in abutment against the sealing surface 7a formed within the body 7 of the valve by the action of the permanent magnet 8.

Said magnet is supported by supporting means formed by the ring 9, by being accommodated within the hub 9a, which is connected to said ring by way of ribs such as 9b, which are adapted to form channels such as 9c for the passage of air, and said ring, according to an important characteristic of the invention, is associated with the body 7 of the valve by way of the thread 9d.

It is thus possible to arrange the permanent magnet 8 at different distances from the flow control element 6 in abutment against the sealing surface 7a, simply by rotating the ring 9, thus changing the attraction force applied by said magnet to the flow control element, which is inversely proportional, as is known, to their mutual distance.

This allows to vary the degree of vacuum, which is indeed equal to said force: accordingly, by screwing on fully the ring 9, as shown in FIGS. 1, 2 and 3, the magnet 8 is moved to the minimum distance from the flow control element 6 in abutment against the sealing surface 7a, and accordingly the highest degree of vacuum is produced, as shown indicatively by the numeral 30 imprinted on the ring 9, which has become visible through the window 7b provided on the wall of the body 7 of the valve, which expresses said degree of vacuum in centimeters of water head.

By fully unscrewing the ring 9, as shown in FIG. 4, the magnet 8 is instead brought to the maximum distance from the flow control element 6, forming the lowest degree of vacuum: the indication displayed in this situation through the window 7b is indicatively the numeral 10, which is also imprinted on the ring 9, so as to indicate that the degree of vacuum provided within the apparatus is equal to 10 centimeters of water head.

The valve 5 is provided with means for indicating the flow of air through said valve, which comprise the protrusion generally designated by the reference numeral 10, which is associated with the valve body 7 so as to be arranged inside the chamber 2, as shown clearly by FIG. 1.

Said protrusion 10 comprises a U-shaped duct, which has a first branch 11 that is provided, at its end, with the tooth 11a that forms an abutment for retaining the flow control element 6 in the fully open position, which is such that the air flow encounters no resistance in passing through the valve.

Said first branch 11 is connected to the port for the flow of air inside the valve 5, while the second branch 12 of the U-shaped duct is open at the end 12a onto the chamber 2; said second branch 12 accommodates the spherical body 13, which is designed to be carried by the air entering the valve 5 from a position shown in FIGS. 2 and 4, which is not visible from outside and is assumed in the absence of air, to the position shown in FIG. 3, which faces the open window 12b so that it is visible from outside through the transparent wall of the chamber 2.

Instead of the body 13, it is possible to provide on the bottom of the U-shaped duct, made of transparent material, a water mass inside which bubbling visible from outside is produced due to the flow of air.

Another embodiment of the means for indicating the flow of air that can be used when the valve 5 is inverted with respect to the position shown in the figures, consists in adopting a conical duct that is associated with the end of the air flow port inside the valve on the flow control element side; said duct contains a body that is adapted to be carried by the air from a position at the base of the duct, assumed in the absence of air, to an overlying position, which is visible from outside through a window closed by means of transparent material.

It should be noted that in this embodiment said duct might be cylindrical with an open window; the branch 12 of the U-shaped duct of the embodiment shown in the figures can in turn be provided with a conical shape, with a window closed by means of transparent material.

The described invention is susceptible of numerous other modifications and variations, all of which are within the scope of the appended claims: thus, for example, the means that indicate the flow of air through the valve 5 can be provided in any manner and may be omitted if the indication of the presence of aspirated air is provided by way of means that are not connected to said valve.

The means for supporting the magnet in an adjustable position also can be provided in any manner.

The disclosures in Italian Patent Application No. MI2002A000031 from which this application claims priority are incorporated herein by reference.

What is claimed is:

1. A device for adjusting the degree of vacuum in an apparatus for collecting substances by suction, comprising: a chamber; a valve with a body that is provided with a sealing surface and with a first air flow port connected to atmosphere at one end and to said chamber at the other end; a vacuum source, said chamber being connected to said vacuum source and to said collection apparatus; a permanent magnet; supporting means associated with the body of the valve in an adjustable position so as to allow arrangement of said magnet at different distances with respect to said sealing surface; and a flow control element provided so as to be attracted into a closed position in abutment against said sealing surface by action of said magnet, wherein said supporting means comprises a ring that is associated with the body of the valve by way of a thread thereof, said ring comprising ribs connected to a central hub for accommodating said magnet, said ribs forming air passage channels.

2. The device of claim 1, further comprising a series of numerical indications provided on the ring for supporting the permanent magnet, that appear selectively through a window provided in the valve body following rotation of said ring in order to provide information regarding a degree of vacuum provided by said device.

3. The device of claim 1, comprising an abutment for stopping opening motion of the flow control element in such a position as to ensure that with the flow control element fully open air flow encounters no resistance in passing through the valve.

4. A device for adjusting the degree of vacuum in an apparatus for collecting substances by suction, comprising: a chamber, a valve with a body that is provided with a sealing surface and with a first air flow port connected to atmosphere at one end and to said chamber at the other end; a vacuum source, said chamber being connected to said vacuum source and to said collection apparatus; a permanent magnet; supporting means associated with the body of the valve in an adjustable position so as to allow arrangement of said magnet at different distances with respect to said sealing surface; a flow control element provided so as to be attracted into a closed position in abutment against said sealing surface by action of said magnet; and indication means for indicating the flow of air through the valve for connection to the atmosphere.

5. The device of claim 4, wherein said means for indicating the flow of air through the valve is constituted by a protrusion associated with the valve body that comprises a U-shaped duct connected, at an end of a first branch of the duct, to the first, atmosphere air flow port on a flow control element side and connected, at an end of a second branch of the duct, to the chamber connected to the vacuum source and to the collection apparatus, and a body accommodated in said second branch that is adapted to be conveyed by air flow that enters from the valve from a position at a base of the U-shaped duct assumed by the body in the absence of air flow to a position that faces a window formed in a wall of said second duct branch so as to be visible from outside.

6. The device of claim 4, wherein said means for indicating the flow of air through the valve is constituted by a protrusion associated with the valve body that comprises a U-shaped duct connected, at an end of a first branch of the duct, to the first, atmosphere air flow port on a flow control element side and connected, at an end of a second branch of the duct, to the chamber connected to the vacuum source and to the collection apparatus, and a water mass provided on a bottom of said U-shaped duct made of transparent material, so that air flow causes bubbling that is visible from outside.

7. The device of claim 4, wherein said means for indicating the flow of air through the valve is constituted by a duct that is associated with an end of the first, atmosphere air flow port on a side of the chamber that is connected to the vacuum source and to the collection apparatus, and a body arranged in said duct so as to be carried by air flow from a position at a base of the duct, which the body assumes in the absence of air flow, to an overlying position, which is visible from outside through a window formed in a wall of said duct.

8. The device of claim 7, wherein the duct for accommodating the body adapted to be carried by the air flow has a cylindrical cross-sectional shape, with a window formed in the wall that is open.

9. The device of claim 7, wherein the duct for accommodating the body adapted to be carried by the air flow is conical, with a window formed in the wall that is closed by way of transparent material.

* * * * *